(12) United States Patent
Xie et al.

(10) Patent No.: US 9,635,723 B2
(45) Date of Patent: *Apr. 25, 2017

(54) SYSTEMS AND METHODS FOR LOW-POWER LAMP COMPATIBILITY WITH A TRAILING-EDGE DIMMER AND AN ELECTRONIC TRANSFORMER

(71) Applicant: PHILIPS LIGHTING HOLDING B.V., Eindhoven (NL)

(72) Inventors: Yanhui Xie, Sugar Land, TX (US); Sahil Singh, Austin, TX (US); Michael A. Kost, Austin, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,003

(22) Filed: Apr. 30, 2014

(65) Prior Publication Data

US 2015/0061536 A1 Mar. 5, 2015

Related U.S. Application Data

(60) Provisional application No. 61/872,250, filed on Aug. 30, 2013.

(51) Int. Cl.
*H05B 37/02* (2006.01)
*H05B 33/08* (2006.01)
*H02M 1/42* (2007.01)

(52) U.S. Cl.
CPC ........ *H05B 33/0845* (2013.01); *H02M 1/425* (2013.01); *H05B 33/0815* (2013.01); *Y02B 70/126* (2013.01)

(58) Field of Classification Search
CPC . H05B 37/02; H05B 33/0815; H05B 33/0803
See application file for complete search history.

(56) References Cited

U.S. PATENT DOCUMENTS 3,806,829 A 4/1974 Duston et al.
4,008,414 A 2/1977 Agnew
(Continued)

FOREIGN PATENT DOCUMENTS

EP 2403120 A2 1/2012
EP 2590477 A1 5/2013
(Continued)

OTHER PUBLICATIONS

International Search Report and Written Opinion, International Patent Application No. PCT/US2013/071690, mailed Jun. 4, 2014, 13 pages.

(Continued)

*Primary Examiner* — Tung X Le
*Assistant Examiner* — Raymond R Chai (57) ABSTRACT

In accordance with embodiments of the present disclosure, an apparatus may comprise a controller to provide compatibility between a load and a secondary winding of an electronic transformer. The controller may be configured to operate a single-stage power converter in a first power mode for a first period of time, such that the single-stage power converter is enabled to transfer energy from the secondary winding to the load during the first power mode and operate the single-stage power converter in a second power mode for a second period of time prior to the first period of time, such that the single-stage power converter is enabled to transfer energy from the secondary winding to the load during the second power mode, wherein the first power mode and the second power mode occur within a half-line cycle of an electronic transformer secondary signal present on the secondary winding.

38 Claims, 6 Drawing Sheets

(56) References Cited

U.S. PATENT DOCUMENTS

| | | |
|---|---|---|
| 4,562,382 A | 12/1985 | Elliott |
| 5,040,236 A | 8/1991 | Costello |
| 5,089,753 A | 2/1992 | Mattas |
| 5,416,387 A | 5/1995 | Cuk et al. |
| 5,583,402 A | 12/1996 | Moisin et al. |
| 5,650,694 A | 7/1997 | Jayaraman et al. |
| 5,872,429 A | 2/1999 | Xia et al. |
| 6,369,461 B1 | 4/2002 | Jungreis et al. |
| 6,407,935 B1 | 6/2002 | Chang et al. |
| 7,812,550 B2 * | 10/2010 | Harmgardt et al. .......... 315/291 |
| 8,067,902 B2 | 11/2011 | Newman, Jr. et al. |
| 8,212,491 B2 | 7/2012 | Kost et al. |
| 8,547,034 B2 | 10/2013 | Melanson et al. |
| 8,653,759 B2 | 2/2014 | Vigh et al. |
| 8,664,883 B2 | 3/2014 | Hiramatu et al. |
| 8,698,483 B2 | 4/2014 | Riesebosch |
| 8,716,957 B2 | 5/2014 | Melanson et al. |
| 8,723,431 B2 | 5/2014 | Deppe et al. |
| 8,742,674 B2 | 6/2014 | Shteynberg et al. |
| 8,928,243 B2 | 1/2015 | Potter et al. |
| 8,933,648 B1 | 1/2015 | Putman et al. |
| 9,072,125 B2 | 6/2015 | King et al. |
| 9,167,664 B2 | 10/2015 | Xie et al. |
| 9,215,765 B1 | 12/2015 | Mokry et al. |
| 9,215,770 B2 * | 12/2015 | Mazumdar ......... H05B 33/0818 |
| 2003/0127994 A1 | 7/2003 | Patchornik et al. |
| 2003/0151931 A1 | 8/2003 | Kohno |
| 2005/0174162 A1 | 8/2005 | Cheng et al. |
| 2005/0249667 A1 | 11/2005 | Tuszynski et al. |
| 2006/0147371 A1 | 7/2006 | Tuszynski et al. |
| 2007/0040516 A1 | 2/2007 | Chen |
| 2007/0076459 A1 | 4/2007 | Limpkin |
| 2007/0262654 A1 | 11/2007 | Mosebrook et al. |
| 2007/0285028 A1 | 12/2007 | Tsinker et al. |
| 2008/0013343 A1 | 1/2008 | Matthews |
| 2008/0018261 A1 | 1/2008 | Kastner |
| 2008/0024074 A1 | 1/2008 | Mosebrook et al. |
| 2008/0119421 A1 | 5/2008 | Tuszynski et al. |
| 2008/0224636 A1 | 9/2008 | Melanson |
| 2009/0184662 A1 | 7/2009 | Given et al. |
| 2009/0295292 A1 | 12/2009 | Harmgardt et al. |
| 2010/0013409 A1 | 1/2010 | Quek et al. |
| 2010/0141178 A1 | 6/2010 | Negrete et al. |
| 2010/0164406 A1 | 7/2010 | Kost et al. |
| 2010/0225251 A1 | 9/2010 | Maruyama |
| 2010/0244726 A1 | 9/2010 | Melanson |
| 2011/0012530 A1 | 1/2011 | Zheng et al. |
| 2011/0115400 A1 | 5/2011 | Harrison et al. |
| 2011/0121751 A1 | 5/2011 | Harrison et al. |
| 2011/0121752 A1 | 5/2011 | Newman, Jr. et al. |
| 2011/0121754 A1 | 5/2011 | Shteynberg et al. |
| 2011/0127925 A1 | 6/2011 | Huang et al. |
| 2011/0199017 A1 | 8/2011 | Dilger |
| 2011/0210674 A1 | 9/2011 | Melanson |
| 2011/0266968 A1 | 11/2011 | Bordin et al. |
| 2011/0309759 A1 | 12/2011 | Shteynberg et al. |
| 2012/0025729 A1 | 2/2012 | Melanson et al. |
| 2012/0043913 A1 | 2/2012 | Melanson |
| 2012/0049752 A1 | 3/2012 | King et al. |
| 2012/0098454 A1 | 4/2012 | Grotkowski et al. |
| 2012/0106216 A1 | 5/2012 | Tzinker et al. |
| 2012/0112638 A1 | 5/2012 | Melanson et al. |
| 2012/0112648 A1 | 5/2012 | Hariharan |
| 2012/0119669 A1 | 5/2012 | Melanson et al. |
| 2012/0139431 A1 | 6/2012 | Thompson |
| 2012/0146546 A1 | 6/2012 | Hu et al. |
| 2012/0169240 A1 | 7/2012 | Macfarlane |
| 2012/0229041 A1 | 9/2012 | Saes et al. |
| 2012/0230073 A1 | 9/2012 | Newman et al. |
| 2012/0242238 A1 * | 9/2012 | Chen et al. ............... 315/200 R |
| 2012/0286684 A1 | 11/2012 | Melanson et al. |
| 2012/0286696 A1 | 11/2012 | Ghanem |
| 2012/0286826 A1 | 11/2012 | King et al. |
| 2012/0299501 A1 | 11/2012 | Kost et al. |
| 2013/0002163 A1 | 1/2013 | He et al. |
| 2013/0113458 A1 | 5/2013 | Riesebosch |
| 2013/0278159 A1 | 10/2013 | Del Carmen, Jr. et al. |
| 2014/0009078 A1 | 1/2014 | Xie et al. |
| 2014/0009079 A1 | 1/2014 | Xie et al. |
| 2014/0009082 A1 | 1/2014 | King et al. |
| 2014/0028214 A1 * | 1/2014 | Mazumdar et al. .......... 315/279 |
| 2014/0167639 A1 | 6/2014 | King et al. |
| 2014/0167652 A1 | 6/2014 | King et al. |
| 2014/0239832 A1 | 8/2014 | Shteynberg et al. |
| 2014/0333205 A1 | 11/2014 | Kost et al. |

FOREIGN PATENT DOCUMENTS

| | | |
|---|---|---|
| WO | 2011063205 A1 | 5/2011 |
| WO | 2011111005 A1 | 9/2011 |
| WO | 2013072793 A1 | 5/2013 |
| WO | 2013090904 A1 | 6/2013 |

OTHER PUBLICATIONS

International Search Report and Written Opinion, International Patent Application No. PCT/US2013/047777, mailed Jun. 26, 2014, 21 pages.

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

International Search Report and Written Opinion, International Patent Application No. PCT/US2015/035052, mailed Oct. 21, 2015, 11 pages.

* cited by examiner

SYSTEMS AND METHODS FOR LOW-POWER LAMP COMPATIBILITY WITH A TRAILING-EDGE DIMMER AND AN ELECTRONIC TRANSFORMER

RELATED APPLICATIONS

The present disclosure claims priority to U.S. Provisional Patent Application Ser. No. 61/872,250, filed Sep. 3, 2013, which is incorporated by reference herein in its entirety.

FIELD OF DISCLOSURE

The present disclosure relates in general to the field of electronics, and more specifically to systems and methods for ensuring compatibility between one or more low-power lamps and the power infrastructure to which they are coupled.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load. A particular type of phase-cutting dimmer is known as a trailing-edge dimmer. A trailing-edge dimmer phase cuts from the end of an AC cycle, such that during the phase-cut angle, the dimmer is "off" and supplies no output voltage to its load, but is "on" before the phase-cut angle and in an ideal case passes a waveform proportional to its input voltage to its load.

Figure 1:
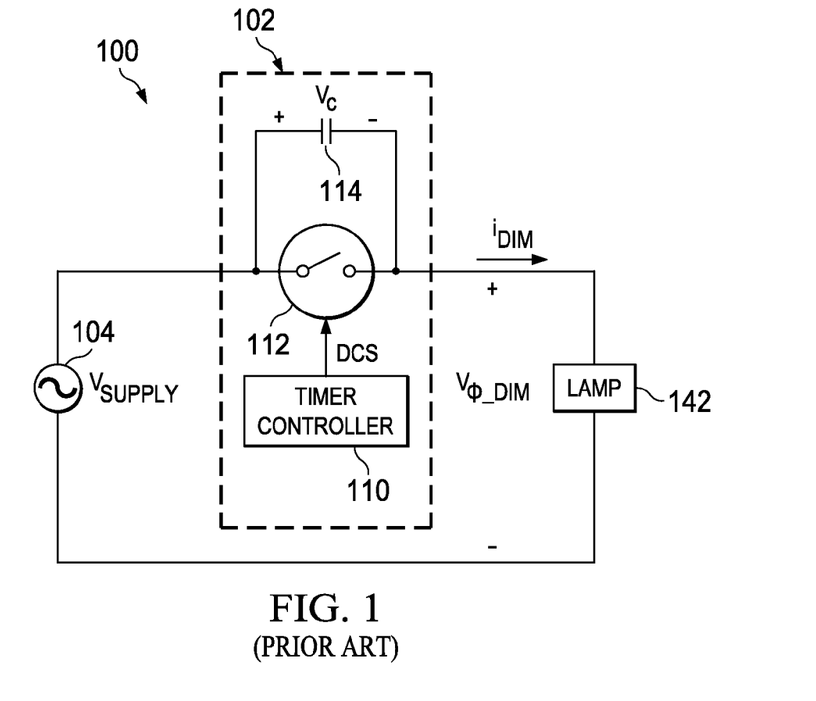
FIG. 1 illustrates a lighting system that includes a phase-cut trailing-edge dimmer, as is known in the art.
Figure 2:
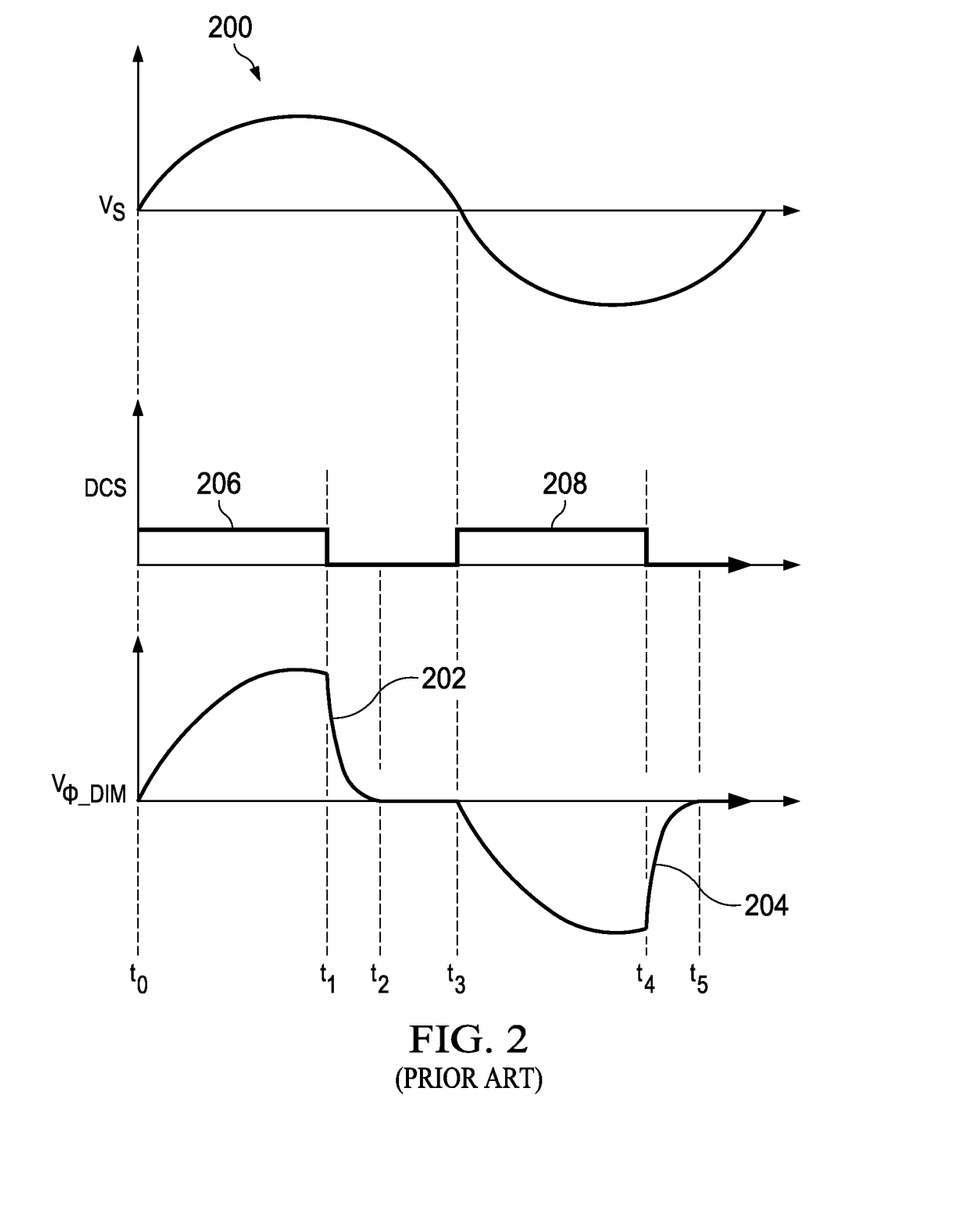
FIG. 2 illustrates example voltage and current graphs associated with the lighting system depicted in FIG. 1, as is known in the art.

FIG. 1 depicts a lighting system 100 that includes a trailing-edge, phase-cut dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$, indicated by voltage waveform 200, is, for example, a nominally 60 Hz/110 V line voltage in the United States of America or a nominally 50 Hz/220 V line voltage in Europe. Trailing edge dimmer 102 phase cuts trailing edges, such as trailing edges 202 and 204, of each half cycle of supply voltage $V_{SUPPLY}$. Since each half cycle of supply voltage $V_{SUPPLY}$ is 180 degrees of the supply voltage $V_{SUPPLY}$, the trailing edge dimmer 102 phase cuts the supply voltage $V_{SUPPLY}$ at an angle greater than 0 degrees and less than 180 degrees. The phase cut, input voltage $V_{\Phi\_DIM}$ to lamp 142 represents a dimming level that causes the lighting system 100 to adjust power delivered to lamp 142, and, thus, depending on the dimming level, increase or decrease the brightness of lamp 142.

Dimmer 102 includes a timer controller 110 that generates dimmer control signal DCS to control a duty cycle of switch 112. The duty cycle of switch 112 is a pulse width (e.g., times $t_1-t_0$) divided by a period of the dimmer control signal (e.g., times $t_3-t_0$) for each cycle of the dimmer control signal DCS. Timer controller 110 converts a desired dimming level into the duty cycle for switch 112. The duty cycle of the dimmer control signal DCS is increased for lower dimming levels (i.e., higher brightness for lamp 142) and decreased for higher dimming levels. During a pulse (e.g., pulse 206 and pulse 208) of the dimmer control signal DCS, switch 112 conducts (i.e., is "on"), and dimmer 102 enters a low resistance state. In the low resistance state of dimmer 102, the resistance of switch 112 is, for example, less than or equal to 10 ohms. During the low resistance state of switch 112, the phase cut, input voltage $V_{\Phi\_DIM}$ tracks the input supply voltage $V_{SUPPLY}$ and dimmer 102 transfers a dimmer current $i_{DIM}$ to lamp 142.

When timer controller 110 causes the pulse 206 of dimmer control signal DCS to end, dimmer control signal DCS turns switch 112 off, which causes dimmer 102 to enter a high resistance state (i.e., turns off). In the high resistance state of dimmer 102, the resistance of switch 112 is, for example, greater than 1 kiloohm. Dimmer 102 includes a capacitor 114, which charges to the supply voltage $V_{SUPPLY}$ during each pulse of the dimmer control signal DCS. In both the high and low resistance states of dimmer 102, the capacitor 114 remains connected across switch 112. When switch 112 is off and dimmer 102 enters the high resistance state, the voltage $V_C$ across capacitor 114 increases (e.g., between times $t_1$ and $t_2$ and between times $t_4$ and $t_5$). The rate of increase is a function of the amount of capacitance C of capacitor 114 and the input impedance of lamp 142. If effective input resistance of lamp 142 is low enough, it permits a high enough value of the dimmer current $i_{DIM}$ to allow the phase cut, input voltage $V_{\Phi\_DIM}$ to decay to a zero crossing (e.g., at times $t_2$ and $t_5$) before the next pulse of the dimmer control signal DCS.

Dimming a light source with dimmers saves energy when operating a light source and also allows a user to adjust the intensity of the light source to a desired level. However, conventional dimmers, such as a trailing-edge dimmer, that are designed for use with resistive loads, such as incandescent light bulbs, often do not perform well when supplying a raw, phase modulated signal to a reactive load such as a power converter or transformer, as is discussed in greater detail below.

Figure 3:
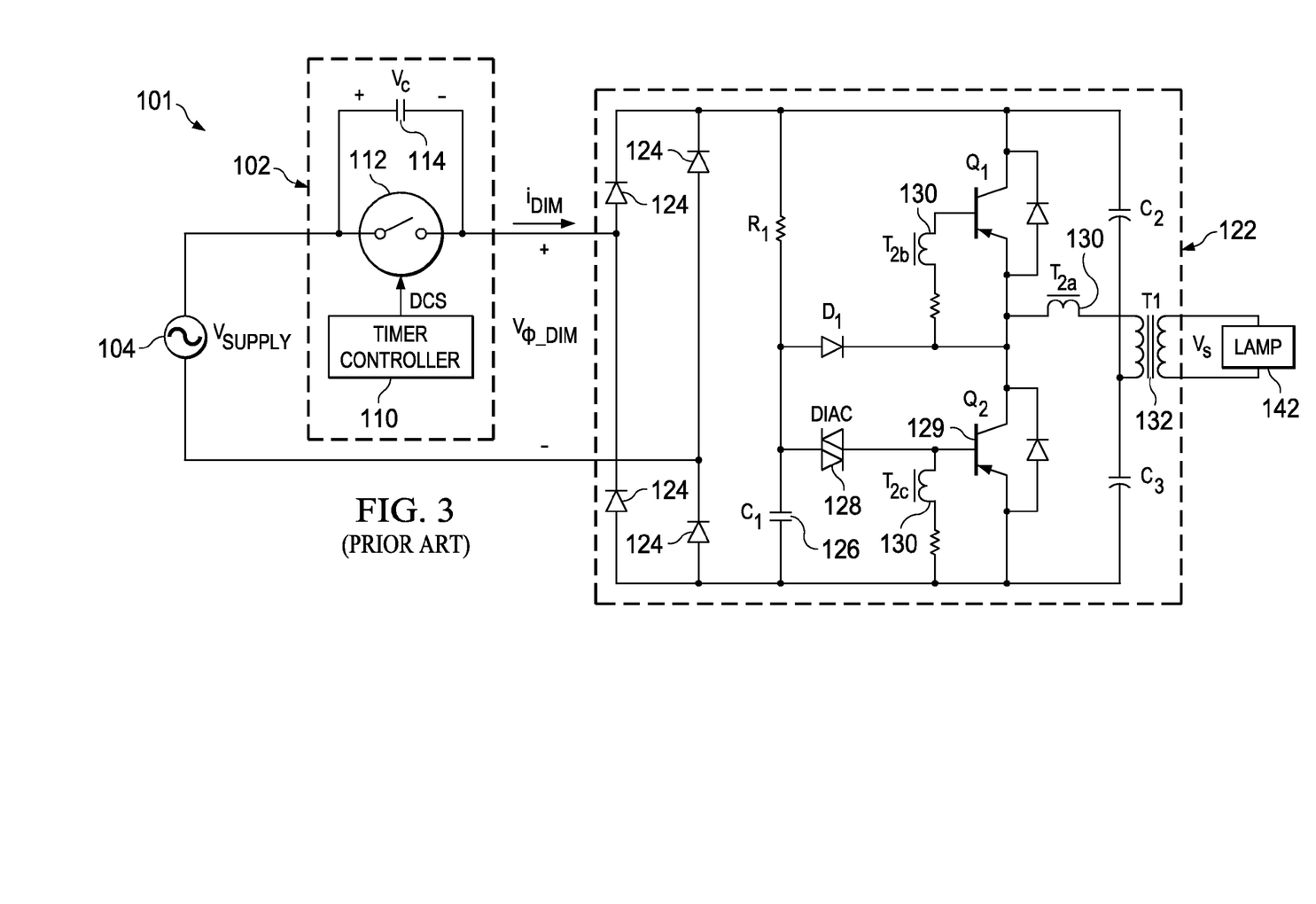
FIG. 3 illustrates a lighting system that includes a phase-cut trailing-edge dimmer and an electronic transformer, as is known in the art.
Figure 4:
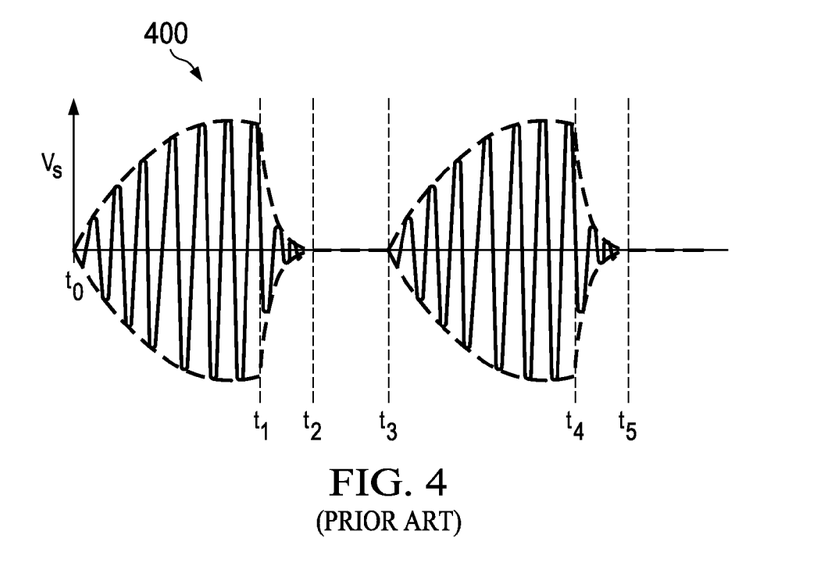
FIG. 4 illustrates example voltage and current graphs associated with the lighting system depicted in FIG. 3, as is known in the art.

FIG. 3 depicts a lighting system 101 that includes a trailing-edge, phase-cut dimmer 102, an electronic transformer 122, and a lamp 142. Such a system may be used, for example, to transform a high voltage (e.g., 110V, 220 V) to a low voltage (e.g., 12 V) for use with a halogen lamp (e.g., an MR16 halogen lamp). FIG. 4 depicts example voltage graphs associated with lighting system 101.

As is known in the art, electronic transformers operate on a principle of self-resonant circuitry. Referring to FIGS. 3 and 4, when dimmer 102 is used in connection with transformer 122 and a low-power lamp 142, the low current draw of lamp 142 may be insufficient to allow electronic transformer 122 to reliably self-oscillate.

To further illustrate, electronic transformer 122 may receive the dimmer output voltage $V_{\Phi\_DIM}$ at its input where it is rectified by a full-bridge rectifier formed by diodes 124. As voltage $V_{\Phi\_DIM}$ increases in magnitude, voltage on capacitor 126 may increase to a point where diac 128 will turn on, thus also turning on transistor 129. Once transistor 129 is on, capacitor 126 may be discharged and oscillation will start due to the self-resonance of switching transformer 130, which includes a primary winding ($T_{2a}$) and two secondary windings ($T_{2b}$ and $T_{2c}$). Accordingly, as depicted in FIG. 4, an oscillating output voltage $V_s$ 400 will be formed on the secondary winding of transformer 132 and delivered to lamp 142 while dimmer 102 is on, bounded by an AC voltage level proportional to $V_{\Phi\_DIM}$.

However, as mentioned above, many electronic transformers will not function properly with low-current loads. With a light load, there may be insufficient current through the primary winding of switching transformer 130 to sustain oscillation. For legacy applications, such as where lamp 142 is a 35-watt halogen bulb, lamp 142 may draw sufficient current to allow transformer 122 to sustain oscillation. However, should a lower-power lamp be used, such as a six-watt light-emitting diode (LED) bulb, the current drawn by lamp 142 may be insufficient to sustain oscillation in transformer 122, which may lead to unreliable effects, such as visible flicker and a reduction in total light output below the level indicated by the dimmer.

In addition, traditional approaches for providing compatibility between a low-power lamp and the power infrastructure to which it is coupled have numerous shortcomings. For example, methods and systems for providing compatibility between a low-power lamp and the power infrastructure to which it is coupled are described in U.S. Patent Publication No. 2014/0009078 entitled "Systems and Methods for Low-Power Lamp Compatibility with a Trailing-Edge Dimmer and an Electronic Transformer," filed on Mar. 13, 2013 and U.S. Patent Publication No. 2014/0028214 entitled "Systems and Methods for Low-Power Lamp Compatibility with a Trailing-Edge Dimmer and an Electronic Transformer" filed on Sep. 27, 2013. U.S. Patent Publication No. 2014/0009078 discloses systems and methods for predicting based on an electronic transformer secondary signal an estimated occurrence of a high-resistance state of a trailing-edge dimmer, wherein the high-resistance state occurs when the trailing-edge dimmer begins phase-cutting an alternating current voltage signal and operating the load in a high-current mode for a period of time immediately prior to the estimated occurrence of the high-resistance state. U.S. Patent Publication No. 2014/0009078 discloses systems and methods for (i) predicting based on an electronic transformer secondary signal an estimated occurrence of a high-resistance state of a trailing-edge dimmer coupled to a primary winding of an electronic transformer, wherein the high-resistance state occurs when the trailing-edge dimmer begins phase-cutting an alternating current voltage signal; (ii) operating a power converter in a trailing-edge exposure mode for a first period of time immediately prior to the estimated occurrence of the high-resistance state, such that the power converter is enabled to transfer energy from the secondary winding to the load during the trailing-edge exposure mode; and (iii) operating the power converter in a power mode for a second period of time prior to and non-contiguous with the first period of time, such that the power converter is enabled to transfer energy from the secondary winding to the load during the power mode. A disadvantage of these approaches are that when such approaches are employed in a single-stage power converter, charge delivery from the electronic transformer to the load may not be consistent, which may result in undesirable effects, including flicker.

SUMMARY

In accordance with the teachings of the present disclosure, certain disadvantages and problems associated with ensuring compatibility of a low-power lamp with a dimmer and a transformer may be reduced or eliminated.

In accordance with embodiments of the present disclosure, an apparatus may comprise a controller to provide compatibility between a load and a secondary winding of an electronic transformer. The controller may be configured to operate a single-stage power converter in a first power mode for a first period of time, such that the single-stage power converter is enabled to transfer energy from the secondary winding to the load during the first power mode and operate the single-stage power converter in a second power mode for a second period of time prior to the first period of time, such that the single-stage power converter is enabled to transfer energy from the secondary winding to the load during the second power mode, wherein the first power mode and the second power mode occur within a half-line cycle of an electronic transformer secondary signal present on the secondary winding.

In accordance with these and other embodiments of the present disclosure, a method for providing compatibility between a load and a secondary winding of an electronic transformer may include operating a single-stage power converter in a first power mode for a first period of time, such that the single-stage power converter is enabled to transfer energy from the secondary winding to the load during the first power mode and operating the single-stage power converter in a second power mode for a second period of time prior to the first period of time, such that the single-stage power converter is enabled to transfer energy from the secondary winding to the load during the second power mode, wherein the first power mode and the second power mode occur within a half-line cycle of an electronic transformer secondary signal present on the secondary winding.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 5:
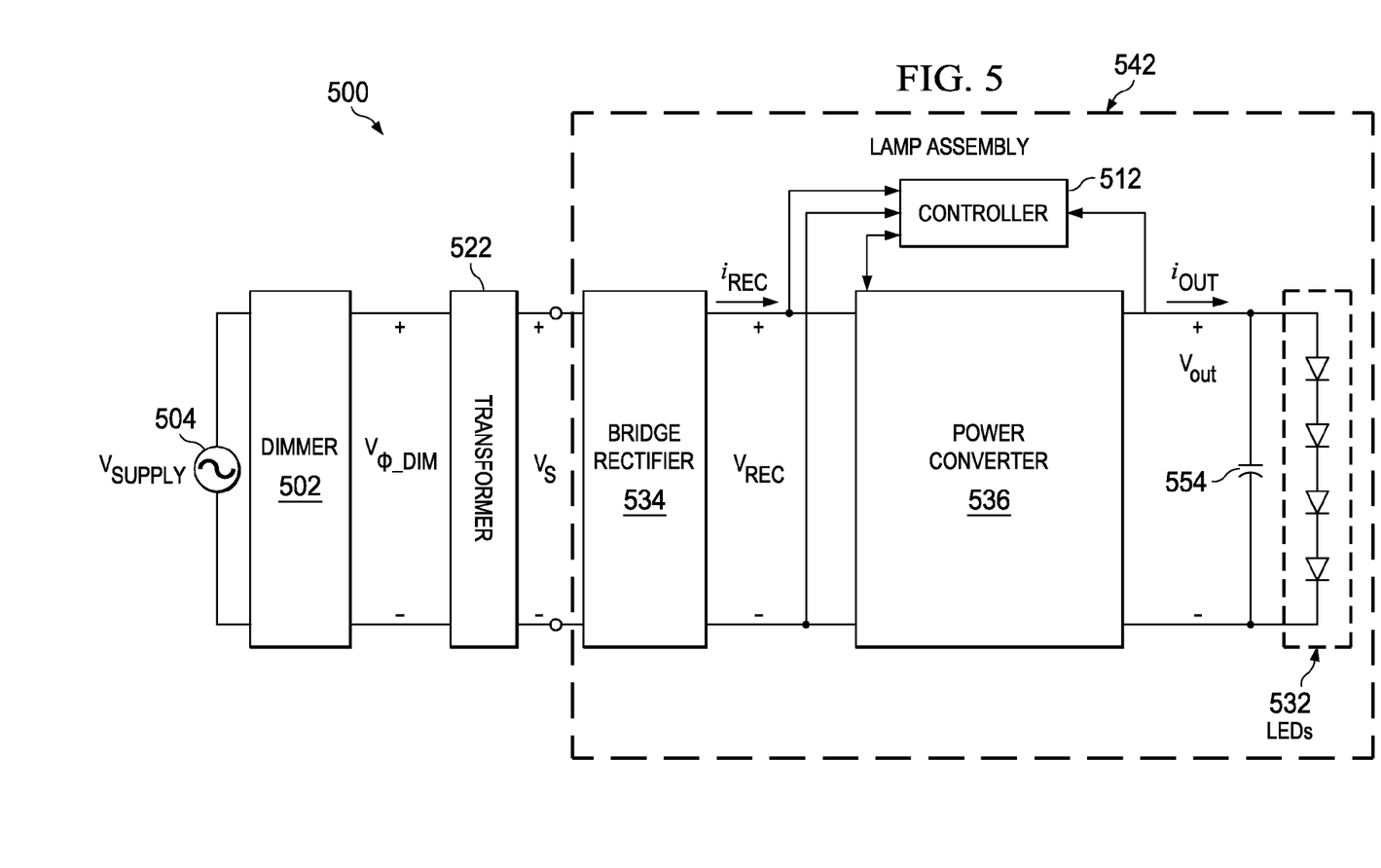
FIG. 5 illustrates an example lighting system including a controller for providing compatibility between a low-power lamp and an electronic transformer driven by a trailing-edge dimmer, in accordance with embodiments of the present disclosure.
Figure 6A:
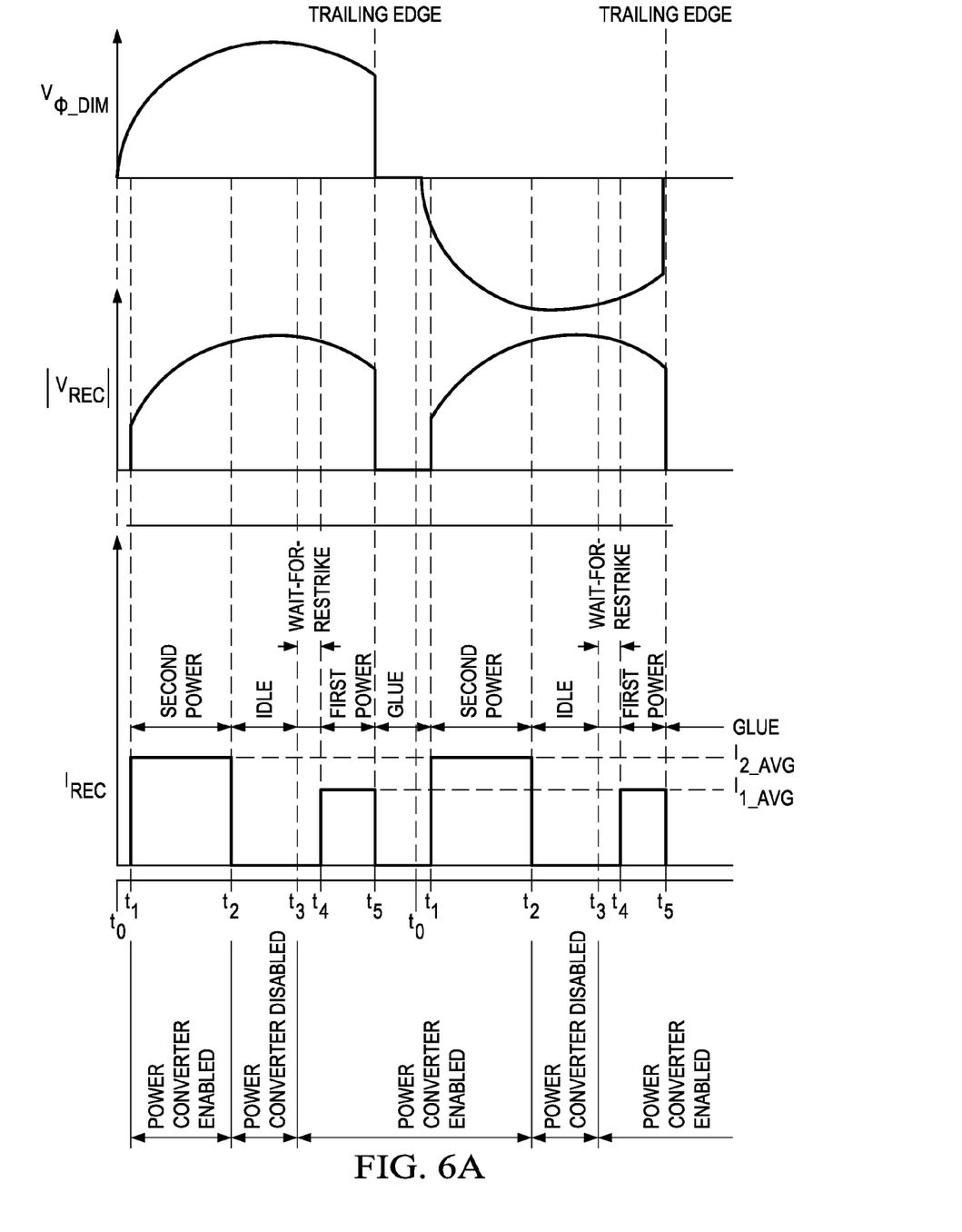
FIGS. 6A and 6B depict example voltage and current graphs associated with particular embodiments of the lighting system depicted in FIG. 5, in accordance with embodiments of the present disclosure.
Figure 6B:
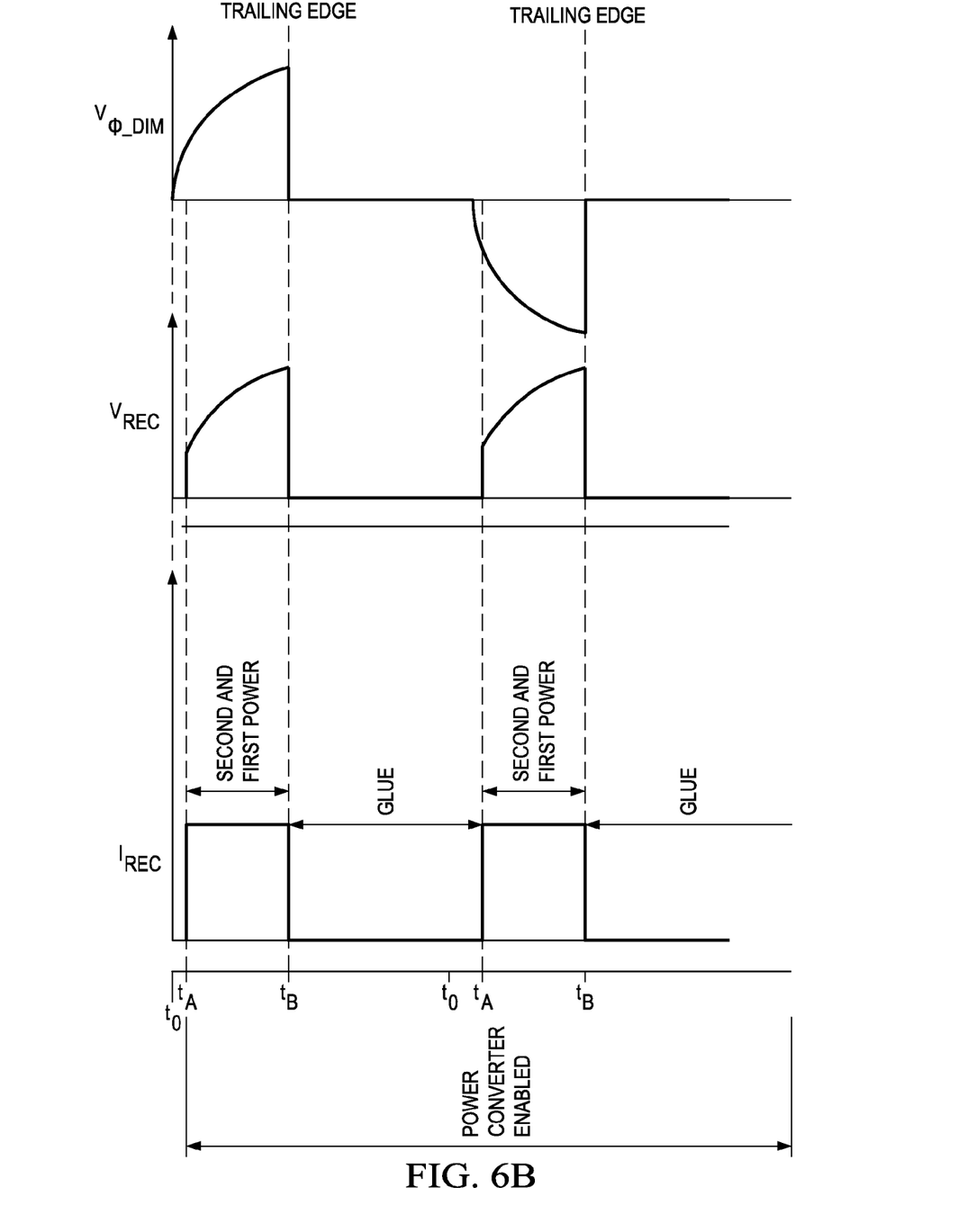

FIG. 5 illustrates an example lighting system 500 including a controller 512 for providing compatibility between a low-power lamp assembly 542 and other elements of a lighting system, in accordance with embodiments of the present disclosure. FIGS. 6A and 6B depict example voltage and current graphs associated with lighting system 500 depicted in FIG. 5, in accordance with embodiments of the present disclosure. As shown in FIG. 5, lighting system 500 may include a voltage supply 504, a dimmer 502, a transformer 522, a lamp assembly 542, and a controller 512. Voltage supply 504 may generate a supply voltage $V_{SUPPLY}$ that is, for example, a nominally 60 Hz/110 V line voltage in the United States of America or a nominally 50 Hz/220 V line voltage in Europe.

Dimmer 502 may comprise any system, device, or apparatus for generating a dimming signal to other elements of lighting system 500, the dimming signal representing a dimming level that causes lighting system 500 to adjust power delivered to a lamp, and, thus, depending on the dimming level, increase or decrease the brightness of lamp assembly 542. Thus, dimmer 502 may include a trailing-edge dimmer similar to that depicted in FIGS. 1 and 3, or any other suitable dimmer.

Transformer 522 may comprise any system, device, or apparatus for transferring energy by inductive coupling between winding circuits of transformer 522. Thus, transformer 522 may include an electronic transformer similar to that depicted in FIG. 3, or any other suitable transformer.

Lamp assembly 542 may comprise any system, device, or apparatus for converting electrical energy (e.g., delivered by electronic transformer 522) into photonic energy (e.g., at LEDs 532). In some embodiments, lamp assembly 542 may comprise a multifaceted reflector form factor (e.g., an MR16 form factor). In these and other embodiments, lamp assembly 542 may comprise an LED lamp. As shown in FIG. 5, lamp assembly 542 may include a bridge rectifier 534, a single-stage power converter 536, a load capacitor 554, and a controller 512.

Bridge rectifier 534 may comprise any suitable electrical or electronic device as is known in the art for converting the whole of alternating current voltage signal $v_s$ into a rectified voltage signal $v_{REC}$ having only one polarity.

Single-stage power converter 536 may comprise any system, device, or apparatus configured to convert an input voltage (e.g., $v_{REC}$) to a different output voltage (e.g., $v_{OUT}$) wherein the conversion is based on a control signal (e.g., a pulse-width modulated control signal communicated from controller 512). Accordingly, single-stage power converter 536 may comprise a boost converter, a buck converter, a boost-buck converter, or other suitable power converter.

Output capacitor 554 may comprise any system, device, or apparatus to store energy in an electric field. Output capacitor 554 may be configured such that it stores energy generated by single-stage power converter 536 in the form of the voltage $y_{OUT}$.

LEDs 532 may comprise one or more light-emitting diodes configured to emit photonic energy in an amount based on the voltage $V_{OUT}$ across the LEDs 532.

Controller 512 may comprise any system, device, or apparatus configured to, as described in greater detail elsewhere in this disclosure, determine one or more characteristics of voltage $v_{REC}$ present at the input of single-stage power converter 536 and control an amount of current $i_{REC}$ drawn by single-stage power converter 536 based on such one or more characteristics of voltage $v_{REC}$. Operation of controller 512 may be described by reference to FIGS. 6A and 6B.

As previously described in reference to FIG. 4 in the Background section, an oscillating voltage $V_S$ of the secondary winding of electronic transformer 522 may be delivered to lamp assembly 542, wherein the oscillating voltage is bounded by the waveform $V_{\Phi\_DIM}$ of the output of dimmer 502 depicted in FIG. 6A, the trailing edge of dimmer 502 occurring at times $t_5$ shown in FIG. 6A. Bridge rectifier 534 may in turn rectify transformer secondary voltage $V_S$, generating an oscillating rectified voltage $V_{REC}$ delivered to single-stage power converter 536, wherein the oscillating voltage is bounded by the waveform $|V_{REC}|$ depicted in FIG. 6A.

In operation, controller 512 may receive and analyze the rectified $V_{REC}$ to determine one or more characteristics of the rectified voltage $V_{REC}$. For example, controller 512 may be configured to detect an estimated occurrence of a positive edge of the $V_{REC}$ waveform occurring at time $t_1$ during each half-line cycle when electronic transformer 522 begins oscillating. Such positive edge may occur after the beginning (occurring at time $t_0$) of the half line cycle of the supply voltage $V_{SUPPLY}$ when the voltage $V_{\Phi\_DIM}$ is large enough for electronic transformer 522 to charge its timer capacitor. As another example, controller 512 may be configured to detect an estimated occurrence of a restrike of electronic transformer 522 occurring at time $t_4$ during each half-line cycle when electronic transformer 522 may again begin oscillating. Such restrike may occur during a wait-for-restrike mode (occurring between times time $t_3$ and $t_4$) of power converter 536, during a half-line cycle of the supply voltage $V_{SUPPLY}$ and once electronic transformer 522 is again able to charge its timer capacitor. As a further example, controller 512 may be configured to detect an estimated occurrence of a negative edge of the $V_{REC}$ waveform occurring at time $t_5$ during each half-line cycle corresponding to the trailing edge of output signal $V_{\Phi\_DIM}$ of dimmer 502 (e.g., the estimated occurrence of the high-resistance state of dimmer 502). The estimated occurrence of the trailing edge/high-resistance state of dimmer 502 may be predicted in any suitable manner, for example, using systems and methods disclosed in U.S. patent application Ser. No. 13/298,002 filed Nov. 16, 2011 and entitled "Trailing Edge Dimmer Compatibility with Dimmer High Resistance Prediction," which is incorporated in its entirety herein for all purposes.

From such determination of the estimated occurrences of the positive edge, transformer restrike, the negative edge, and/or other parameters of the signal present on the secondary winding of transformer 522, controller 512 may determine the estimated half-line cycle of supply voltage $V_{SUPPLY}$ (e.g., based on the difference between successive estimated occurrences of the positive edge), the estimated phase angle of dimmer 502 (e.g., based on the difference between an estimated occurrence of the positive edge and an estimated occurrence of a subsequent negative edge), and/or other characteristics of the rectified voltage $V_{REC}$. Thus, during each half-line cycle, controller 512 may use characteristics determined during the previous half-line cycle to control operation of lamp assembly 542.

Based on one or more of the characteristics of the rectified voltage $V_{REC}$ described above, controller 512 may sequentially operate power converter 536 in a plurality of modes. For example, in some instances, controller 512 may operate sequentially in a high-current power mode (during the period labeled as "second power" in FIG. 6A), a low-current idle mode (during the period labeled as "idle" in FIG. 6A), a low-impedance wait-for-restrike mode (during the period labeled as "wait-for-restrike" in FIG. 6A), another high-current power mode (during the period labeled as "first power" in FIG. 6A), and a low-impedance glue mode (during the period labeled as "glue" in FIG. 6A), as described in greater detail below. Controller 512 may sequentially operate in these modes when a control setting (e.g., dimmer phase angle) of dimmer 502 is large enough to controller 512 to enter an idle mode and still provide sufficient current to LEDs 532.

As shown in FIG. 6A, from approximately the estimated occurrence of the positive edge at time $t_1$ to a subsequent time $t_2$, controller 512 may operate in a high-current power mode (the "second power mode") in which it enables power converter 536, allowing power converter 536 to draw a substantially non-zero current $I_{REC}$ such that energy is transferred from electronic transformer 522 to output capacitor 554. During the second power mode, the power converter 536 may draw an average current $I_{2\_AVG}$ above that of a minimum current required to maintain oscillation of electronic transformer 522 during the second power mode.

Following the second power mode, controller 512 may enter a low-current idle mode from time $t_2$ to time $t_3$ in which it disables power converter 536 such that substantially no energy is delivered from electronic transformer 522 to output capacitor 554. Accordingly, during the idle mode, a small amount of ripple may be present on output voltage $V_{OUT}$ and output capacitor 554 may discharge to power converter 536.

Following the idle mode, from time $t_3$ to the beginning of the first power mode at time $t_4$ (e.g., at the estimated occurrence of the restrike of electronic transformer 522), controller 512 may enter a low-impedance wait-for-restrike mode in which it continues to enable power converter 536, but substantially zero current $I_{REC}$ is delivered to power converter 536, on account of no oscillation taking place in electronic transformer 522. The wait-for-restrike mode applies a low impedance to the secondary winding of electronic transformer 522, thus allowing discharge of any residual energy stored in the capacitors of dimmer 502 and/or electronic transformer 522.

Following the wait-for-restrike mode, from approximately the estimated occurrence of the restrike of electronic transformer 522 at time $t_4$ to a time $t_5$ corresponding to the trailing edge of $|V_{REC}|$, controller 512 may operate in another high-current power mode (the "first power mode") in which it enables power converter 536, allowing power converter 536 to draw a substantially non-zero current $I_{REC}$ such that energy is transferred from electronic transformer 522 to output capacitor 554. The first power mode may also allow controller 512 to detect the trailing edge of $|V_{REC}|$. During the first power mode, power converter 536 may draw a substantially non-zero current $I_{REC}$ such that energy is transferred from electronic transformer 522 to output capacitor 554. During the first power mode, the power converter 536 may draw an average current $I_{1\_AVG}$ above that of a minimum current required to maintain oscillation of electronic transformer 522 during the first power mode. Although FIG. 6A depicts average current $I_{1\_AVG}$ being less than that of average current $I_{2\_AVG}$, average $I_{1\_AVG}$ may be lesser than, greater than, or approximately equal to $I_{2\_AVG}$, based on operation of controller 512.

Following the first power mode, from time $t_5$ to the beginning of the subsequent second power mode at time $t_1$ (e.g., at the estimated occurrence of the subsequent positive edge), controller 512 may enter a low-impedance glue mode in which it continues to enable power converter 536, but substantially zero current $I_{REC}$ is delivered to power converter 536, on account of the phase cut of dimmer 502 and a substantially zero voltage $V_{REC}$. The glue mode applies a low impedance to the secondary winding of electronic transformer 522, thus allowing discharge of any residual energy stored in the capacitors of dimmer 502 and/or electronic transformer 522. After the glue mode, controller 512 may again enter the second power mode.

In some embodiments, controller 512 may control one or more of the duration of the first power mode, the duration of the second power mode, the average current $I_{1\_AVG}$ of the first power mode, and the average current $I_{2\_AVG}$ of the second power mode, in order to transfer during a half-line cycle a cumulative energy from the secondary winding of transformer 522 to LEDs 532 which is based on a control setting of dimmer 502.

In these and other embodiments, when the control setting is above a particular value (e.g., large enough for controller 512 to enter an idle mode and still provide sufficient current to LEDs 532 during a half-line cycle), controller 512 may control one or more of the duration of the first power mode, the duration of the second power mode, the average current $I_{1\_AVG}$ of the first power mode, and the average current $I_{2\_AVG}$ of the second power mode, in order to, over a range of control settings, transfer during each half-line cycle the same approximate amount of energy from the secondary winding of transformer 522 to LEDs 532. Stated another way, above a control setting which may be greater than or equal to the particular control setting, controller 512 may control power controller 536 to deliver the same approximate energy in each half-line cycle, regardless of the control setting. Accordingly, when operating in such manner, controller 512 may in effect implement a closed-loop control, in which it dynamically and adaptively varies the amount of energy delivered in each half-line cycle in an attempt to deliver, during each half-line cycle, a target amount of energy.

As described above, controller 512 may control one or more of the duration of the first power mode, the duration of the second power mode, the average current $I_{1\_AVG}$ of the first power mode, and the average current $I_{2\_AVG}$ of the second power mode in order to cause transfer of a desired amount of energy from the secondary winding of electronic transformer 522 to LEDs 532 during a half-line cycle. In some embodiments, one or more of such parameters may be fixed while one or more other of such parameters may be variable by controller 512 in order to cause transfer of the desired amount of energy.

In certain instances, controller 512 may not be able to precisely control a duration and average current $I_{1\_AVG}$ of the first power mode in order to deliver a desired amount of energy during a half-line cycle, as a lack of granularity in the occurrence of restrikes of electronic transformer 522 may not permit controller 512 to begin the first power mode exactly when desired. Accordingly, controller 512 may be configured to predict based on the secondary signal of electronic transformer 522 an estimated occurrence of two successive restrikes of electronic transformer 522 which may demarcate the beginning of the first power mode. Controller 512 may select one of the two successive restrikes as the beginning of oscillation of the electronic transformer 522 and begin the first power mode at approximately the estimated occurrence of the selected beginning of oscillation.

While FIG. 6A shows operation of controller 512 when a control setting of dimmer 502 is above a particular value, FIG. 6B depicts operation of controller 512 for the control setting of dimmer 502 being below the particular value, such that the control setting is of such a low value that controller 512 cannot enter an idle mode and still provide sufficient current to LEDs 532. In such a scenario, as depicted in FIG. 6B, controller 512 may eliminate the idle and wait-for-restrike modes, such that the first power mode and second power mode run consecutively, thus effectively resulting in a single high-current power mode from approximately the estimated occurrence of the positive edge at time $t_A$ to an estimated occurrence of the negative edge at time $t_B$, wherein controller 512 may enable power converter 536 and allow power converter 536 to draw a substantially non-zero current $I_{REC}$ such that energy is transferred from electronic transformer 522 to output capacitor 554.

Following the power mode, from time $t_B$ to the beginning of the subsequent second power mode at time $t_A$ (e.g., at the estimated occurrence of the subsequent positive edge), controller 512 may enter a low-impedance glue mode in which it continues to enable power converter 536, but substantially zero current $I_{REC}$ is delivered to power converter 536, on account of the phase cut of dimmer 502 and a substantially zero voltage $V_{REC}$. The glue mode may apply a low impedance to the secondary winding of electronic transformer 522, thus allowing discharge of any residual energy stored in the capacitors of dimmer 502 and/or electronic transformer 522. After the glue mode, controller 512 may again enter the power mode.

When the control setting is below a particular value (e.g., not large enough for controller 512 to enter an idle mode and still provide sufficient current to LEDs 532 during a half-line cycle) and controller 512 operates in the manner depicted in FIG. 6B, controller 512 may effectively operate in an open-loop control mode, in which it does not dynamically and actively modulate duration of the power mode and/or an average current during the power mode, as it may do with respect to the power modes as described above with respect to FIG. 6A. Instead, controller 512 may cause single-stage power converter 536 to transfer all energy it is capable of transferring from the secondary winding of electronic transformer 522 to LEDs 532 during the power mode. This amount of available energy may vary as the control setting of dimmer 502 varies, and thus the energy delivered to LEDs 532 may vary as the control setting of dimmer 502 varies.

Although the foregoing discussion contemplates that controller 512 determines one or more characteristics of rectified voltage signal $V_{REC}$ in order to control operation of power converter 536, in some embodiments controller 512 may control operation of power converter 536 by receiving and analyzing the unrectified electronic transformer voltage $V_S$. In addition, although the foregoing discussion contemplates a dimmer 502 for varying a supply voltage $V_{SUPPLY}$, the operation of controller 512 discussed above may still apply for lighting systems in which a dimmer 502 is not present, in which case controller 512 may act as if a dimmer 502 was present with a control setting associated with no phase cut (e.g., at a dimmer setting of "100%").

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
   a controller to provide compatibility between a load and a secondary winding of an electronic transformer, wherein the load comprises a lamp, and wherein the controller is configured to:
   operate a single-stage power converter in a first power mode for a first period of time, such that the single-stage power converter is enabled to transfer energy from the secondary winding to the load during the first power mode; and
   operate the single-stage power converter in a second power mode for a second period of time prior to the first period of time, such that the single-stage power converter is enabled to transfer energy from the secondary winding to the load during the second power mode, wherein the first power mode and the second power mode occur within a half-line cycle of an electronic transformer secondary signal present on the secondary winding; and
   predict based on an electronic transformer secondary signal an estimated occurrence of a beginning of oscillation of the electronic transformer;
   wherein the second period of time begins at approximately the estimated occurrence of the beginning of oscillation.

2. The apparatus of claim 1, wherein the controller is further configured to:
   predict based on the electronic transformer secondary signal an estimated occurrence of a high-resistance state of a trailing-edge dimmer coupled to a primary winding of the electronic transformer, wherein the high-resistance state occurs when the trailing-edge dimmer begins phase-cutting an alternating current voltage signal;

operate the single-stage power converter such that the first period of time occurs immediately prior to the estimated occurrence of the high-resistance state; and
predict based on the electronic transformer secondary signal a control setting of the trailing-edge dimmer; and wherein a cumulative energy transferred during the first period of time and the second period of time is based on the control setting.

3. The apparatus of claim 2, wherein the controller is further configured to predict based on the electronic transformer secondary signal an estimated occurrence of a beginning of oscillation of the electronic transformer; wherein the first period of time begins at approximately the estimated occurrence of the beginning of oscillation.

4. The apparatus of claim 2, wherein the controller is further configured to, when the control setting is above a particular value, operate the power converter in an idle mode during a third period of time beginning at an end of the second period of time and prior to the first period of time, such that the power converter is disabled from transferring energy from the secondary winding to the load during the idle mode.

5. The apparatus of claim 4, wherein the controller transfers approximately the same amount of energy from the secondary winding to the load in each half-line cycle of the electronic transformer secondary signal when the control setting is above the particular value.

6. The apparatus of claim 4, wherein the controller is further configured to, when the control setting is above the particular value, operate the power converter in a wait-for-restrike mode immediately after the third period of time and immediately before the first period of time, such that the power converter provides a low input impedance during the wait-for-restrike mode.

7. The apparatus of claim 6, wherein the controller is further configured to operate the power converter in a glue mode immediately after the first period of time, such that the power converter provides a low input impedance during the glue mode.

8. The apparatus of claim 7, wherein the controller is further configured to, when the control setting is above a particular value, sequentially and cyclically operate in the second power mode, the idle mode, the wait-for-restrike mode, the first power mode, and the glue mode.

9. The apparatus of claim 6, wherein the controller is further configured to:
predict based on the electronic transformer secondary signal an estimated occurrence of two successive restrikes of the electronic transformer;
select one of the two successive restrikes as the beginning of oscillation of the electronic transformer; and
begin the first period of time at approximately the estimated occurrence of the selected beginning of oscillation.

10. The apparatus of claim 2, wherein the controller is further configured to modulate at least one of a duration of the first period of time and an average current delivered by the power converter to the load during the first period of time such that the cumulative energy transferred during the first period of time and the second period of time is based on the control setting.

11. The apparatus of claim 2, wherein the controller is further configured to modulate at least one of a duration of the second period of time and an average current delivered by the power converter to the load during the second period of time such that the cumulative energy transferred during the first period of time and the second period of time is based on the control setting.

12. The apparatus of claim 2, wherein, for a given control setting, a duration of the first period of time and an average current delivered by the power converter to the load during the first period of time are fixed for each period of the electronic transformer secondary signal.

13. The apparatus of claim 2, wherein, for a given control setting, a duration of the second period of time and an average current delivered by the power converter to the load during the second period of time are fixed for each period of the electronic transformer secondary signal.

14. The apparatus of claim 1, wherein the controller is further configured to operate the power converter in a glue mode immediately after the first period of time, such that the power converter provides a low input impedance during the glue mode.

15. The apparatus of claim 14, wherein the controller is further configured to, when the control setting is below a particular value, sequentially and cyclically operate in the second power mode, the first power mode, and the glue mode.

16. The apparatus of claim 15, wherein the controller is further configured to, when the control setting is below a particular value, cause the converter to transfer all energy it is capable of transferring from the secondary winding to the load during the first period of time and the second period of time.

17. The apparatus of claim 1, wherein a first average current delivered from the power converter to the load during the first period of time and a second average current delivered from the power converter to the load during the second period of time are each higher than a minimum current required to maintain oscillation of the electronic transformer.

18. The apparatus of claim 1, wherein the lamp comprises a light-emitting diode lamp.

19. The apparatus of claim 1, wherein the lamp further comprises a multifaceted reflector form factor.

20. A method for providing compatibility between a load and a secondary winding of an electronic transformer, wherein the load comprises a lamp, the method comprising:
operating a single-stage power converter in a first power mode for a first period of time, such that the single-stage power converter is enabled to transfer energy from the secondary winding to the load during the first power mode;
operating the single-stage power converter in a second power mode for a second period of time prior to the first period of time, such that the single-stage power converter is enabled to transfer energy from the secondary winding to the load during the second power mode, wherein the first power mode and the second power mode occur within a half-line cycle of an electronic transformer secondary signal present on the secondary winding; and
predicting based on an electronic transformer secondary signal an estimated occurrence of a beginning of oscillation of the electronic transformer; wherein the second period of time begins at approximately the estimated occurrence of the beginning of oscillation.

21. The method of claim 20, further comprising:
predicting based on the electronic transformer secondary signal an estimated occurrence of a high-resistance state of a trailing-edge dimmer coupled to a primary winding of the electronic transformer, wherein the high-resistance state occurs when the trailing-edge dimmer begins phase-cutting an alternating current voltage signal;

operating the single-stage power converter such that the first period of time occurs immediately prior to the estimated occurrence of the high-resistance state; and predicting based on the electronic transformer secondary signal a control setting of the trailing-edge dimmer;

wherein a cumulative energy transferred during the first period of time and the second period of time is based on the control setting.

22. The method of claim 21, further comprising predicting based on the electronic transformer secondary signal an estimated occurrence of a beginning of oscillation of the electronic transformer; wherein the first period of time begins at approximately the estimated occurrence of the beginning of oscillation.

23. The method of claim 21, further comprising, when the control setting is above a particular value, operating the power converter in an idle mode during a third period of time beginning at an end of the second period of time and prior to the first period of time, such that the power converter is disabled from transferring energy from the secondary winding to the load during the idle mode.

24. The method of claim 23, further comprising transferring approximately the same amount of energy from the secondary winding to the load in each half-line cycle of the electronic transformer secondary signal when the control setting is above the particular value.

25. The method of claim 23, further comprising, when the control setting is above the particular value, operating the power converter in a wait-for-restrike mode immediately after the third period of time and immediately before the first period of time, such that the power converter provides a low input impedance during the wait-for-restrike mode.

26. The method of claim 25, further comprising operating the power converter in a glue mode immediately after the first period of time, such that the power converter provides a low input impedance during the glue mode.

27. The method of claim 26, further comprising, when the control setting is above a particular value, sequentially and cyclically operating in the second power mode, the idle mode, the wait-for-restrike mode, the first power mode, and the glue mode.

28. The method of claim 25, further comprising:

predicting based on the electronic transformer secondary signal an estimated occurrence of two successive restrikes of the electronic transformer;

selecting one of the two successive restrikes as the beginning of oscillation of the electronic transformer; and beginning the first period of time at approximately the estimated occurrence of the selected beginning of oscillation.

29. The method of claim 21, further comprising modulating at least one of a duration of the first period of time and an average current delivered by the power converter to the load during the first period of time such that the cumulative energy transferred during the first period of time and the second period of time is based on the control setting.

30. The method of claim 21, further comprising modulating at least one of a duration of the second period of time and an average current delivered by the power converter to the load during the second period of time such that the cumulative energy transferred during the first period of time and the second period of time is based on the control setting.

31. The method of claim 21, wherein, for a given control setting, a duration of the first period of time and an average current delivered by the power converter to the load during the first period of time are fixed for each period of the electronic transformer secondary signal.

32. The method of claim 21, wherein, for a given control setting, a duration of the second period of time and an average current delivered by the power converter to the load during the second period of time are fixed for each period of the electronic transformer secondary signal.

33. The method of claim 20, further comprising operating the power converter in a glue mode immediately after the first period of time, such that the power converter provides a low input impedance during the glue mode.

34. The method of claim 33, further comprising, when the control setting is below a particular value, sequentially and cyclically operating in the second power mode, the first power mode, and the glue mode.

35. The method of claim 34, further comprising, when the control setting is below a particular value, causing the power converter to transfer all energy it is capable of transferring from the secondary winding to the load during the first period of time and the second period of time.

36. The method of claim 20, wherein a first average current delivered from the power converter to the load during the first period of time and a second average current delivered from the power converter to the load during the second period of time are each higher than a minimum current required to maintain oscillation of the electronic transformer.

37. The method of claim 20, wherein the lamp comprises a light-emitting diode lamp.

38. The method of claim 20, wherein the lamp further comprises a multifaceted reflector form factor.

* * * * *